United States Patent
Son et al.

(10) Patent No.: US 9,056,978 B2
(45) Date of Patent: Jun. 16, 2015

(54) NON-HALOGEN FLAME RETARDANT AND HIGH RIGIDITY POLYCARBONATE RESIN COMPOSITION

(71) Applicant: LG CHEM, LTD., Seoul (KR)

(72) Inventors: Sun Mo Son, Daejeon (KR); Ryul Lee, Daejeon (KR); Sung Ho Lee, Daejeon (KR); Sung Tae Ahn, Daejeon (KR); Su Kyoung Lee, Daejeon (KR); Jong Wan Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 2 days.

(21) Appl. No.: 13/981,022

(22) PCT Filed: Jan. 29, 2013

(86) PCT No.: PCT/KR2013/000695
§ 371 (c)(1),
(2) Date: Jul. 22, 2013

(87) PCT Pub. No.: WO2013/115538
PCT Pub. Date: Aug. 8, 2013

(65) Prior Publication Data
US 2014/0058024 A1    Feb. 27, 2014

(30) Foreign Application Priority Data

Feb. 3, 2012 (KR) .......................... 1020120011510
Jan. 25, 2013 (KR) .......................... 1020130008371
Jan. 29, 2013 (of) ................... PCT/KR2013/000695

(51) Int. Cl.
*C08L 69/00* (2006.01)

(52) U.S. Cl.
CPC ..................................... *C08L 69/00* (2013.01)

(58) Field of Classification Search
USPC .......................................................... 524/127
See application file for complete search history.

(56) References Cited

U.S. PATENT DOCUMENTS

| 2004/0063824 A1 | 4/2004 | Takagi et al. |
| 2007/0213437 A1 | 9/2007 | Nagatoshi |

FOREIGN PATENT DOCUMENTS

| CN | 1487976 A | 4/2004 |
| JP | 2001-294741 | 10/2001 |
| JP | 2005048067 | 2/2005 |
| JP | 2007-154093 | 6/2007 |
| JP | 2008-534755 | 8/2008 |
| KR | 1020010009104 A | 2/2001 |
| KR | 100838451 B1 | 6/2008 |
| KR | 100842192 B1 | 6/2008 |
| KR | 1020090052447 A | 5/2009 |

*Primary Examiner* — Ling Choi
*Assistant Examiner* — Thuy-Ai Nguyen
(74) *Attorney, Agent, or Firm* — McKenna Long & Aldridge, LLP

(57) ABSTRACT

A non-halogen flame retardant and high rigidity polycarbonate resin composition is disclosed. The non-halogen flame retardant and high rigidity polycarbonate resin composition has excellent flame retardancy and rigidity by overcoming a conventional problem such as poor rigidity occurred, upon adding a flame retardant agent in polycarbonate resin composition reinforced with a glass fiber having improved rigidity such as flexibility and surface smoothness etc., imposed by the use of the glass fiber.
The polycarbonate resin composition has excellent fluidity, appearance surface quality and flexibility, together with high impact resistance and toughness, and also flame retardancy.

19 Claims, No Drawings

NON-HALOGEN FLAME RETARDANT AND HIGH RIGIDITY POLYCARBONATE RESIN COMPOSITION

This Application is a 35 U.S.C. §371 National Stage Entry of International Application No. PCT/KR2013/000695, filed Jan. 29, 2013, and claims the benefit of Korean Application Nos. 10-2012-0011510, filed Feb. 3, 2012, and 10-2013-0008371, filed Jan. 25, 2013, all of which are incorporated by reference in their entirety herein.

BACKGROUND OF THE INVENTION

1. Field of the Invention

The present invention relates to a non-halogen flame retardant and high rigidity polycarbonate resin composition, and more particularly, to a non-halogen flame retardant and high rigidity polycarbonate resin composition having flame retardancy with rigidity overcome a poor rigidity as a conventional problem occurred, upon adding a flame retardant agent in polycarbonate resin composition reinforced with a glass fiber having improved rigidity such as flexibility and surface smoothness etc., imposed by the use of the glass fiber.

2. Description of the Related Art

Among thermoplastic resins, polycarbonate resins have been widely used as an engineering plastic material due to their high impact resistance, excellent electrical properties, high moldability, stable physical properties in a wide temperature range, and self-extinguishing properties.

Since polycarbonate has various uses and is applied to a variety of electrical and electronic appliances generating a large amount heat, polycarbonate needs to be reinforced with a flame retardant to improve flame retardancy.

When various known brominated and chlorinated flame retardants burn, highly toxic gas is produced. Due to human toxicity thereof, legal restrictions on products thereof increase. In addition, impurities and by-products produced from the brominated and chlorinated flame retardants may corrode equipment for manufacturing and using polycarbonate.

In recent years, as thin film techniques are applied to electrical and electronic appliances, glass fiber-reinforced polycarbonate resins have been used. Since tensile/flexural strength, tensile/flexural modulus, and heat resistance are generally improved when polycarbonate resins are reinforced with a glass fiber, the glass fiber-reinforced polycarbonate resins may be suitable for products under continuous load at high temperature. However, fluidity is rapidly reduced in glass fiber-reinforced polycarbonate resins. Accordingly, surface roughness of a molded article may be increased as the glass fiber protrudes from the surface of the molded article during a molding process, and rigidity such as impact strength and tensile elongation is considerably reduced, thereby being vulnerable to external impact. Thus, there are limitations on use glass fiber-reinforced polycarbonate resins in housings of electrical and electronic appliances.

When polycarbonate having a low molecular weight is used in order to overcome these problems, moldability is improved, but impact resistance and chemical resistance are rapidly deteriorated. When a general impact modifier having a core-shell structure is added thereto, fluidity decreases, sufficient impact resistance cannot be obtained due to destruction of the glass fiber and deterioration of the resin caused by excess shear stress and surface roughness may increase due to protrusion of the glass fiber from the surface.

Korean Patent Application Publication No. 2009-0052447 discloses a glass fiber-reinforced polycarbonate resin composition including 50 to 90% by weight of polycarbonate, to 40% of a glass fiber, 1 to 10% of a thermoplastic elastomer polymer, 1 to 10% of an impact modifier with a core-shell structure, and 1 to 10% of an ethylene acrylate resin. In this case, in molding of a thin product having a complex structure, shrinkage difference occurs due to the glass fiber reinforcement between a flow direction of the glass fiber and a direction perpendicular to the flow direction, thereby causing product deformation.

In order to prevent deformation caused during a molding process, a laminar impact modifier such as talc, mica, and glass flake may be added thereto. However, in this case, efficient rigidity cannot be obtained in comparison with the added amount. In weld lines, physical properties are rapidly deteriorated at weld lines, and thus the composition cannot be applied to products having a lot of weld lines.

Therefore, there is a need to develop a glass fiber-reinforced flame retardant polycarbonate resin composition that has excellent flame retardant, no distortion (warpage) of the product after molding, no surface protruding of the glass fibers, and high impact resistant.

SUMMARY OF THE INVENTION

The present inventors have continued research, and discovered that conventional problems such as the poor rigidity occurred due to addition of flame retardant agent in polycarbonate reinforced with glass fiber in order to improve any flame retardant, are overcome by the provision of a certain flame retardant agent.

That is, it is one object of the present invention to provide a non-halogen flame retardant and high rigidity polycarbonate resin composition with flame retardant and high rigidity by using the certain non-halogenated flame retardant agent, and molded product obtained therefrom.

In accordance with the present invention, the above and other objects can be accomplished by the provision of a non-halogen flame retardant and high rigidity polycarbonate resin composition comprising a polycarbonate resin; a phosphorous compound; a glass fiber; an ethylene-containing acrylic resin; and at least one core-shell type resin selected from the group consisting of an acrylic resin and a butadiene based resin;

wherein the polycarbonate resin and the phosphorous compound are used as aromatic type.

In accordance with an aspect of the present invention, the above and other objects can be accomplished by the provision of a molded product prepared from the polycarbonate resin composition.

DETAILED DESCRIPTION OF THE INVENTION

Hereinafter, the present invention will be described in detail.

To overcome a conventional problem of poor rigidity upon adding a flame retardant agent in a glass fiber-reinforced polycarbonate resin composition with improved rigidity such as flexibility, and surface smoothness, etc., the present invention has a technical feature in a use of a certain flame retardant agent.

In particular, a non-halogen flame retardant and high rigidity polycarbonate resin composition comprising a polycarbonate resin; a phosphorous compound; a glass fiber; an ethylene-containing acrylic resin; and at least one core-shell type resin selected from the group consisting of an acrylic resin and a butadiene based resin; wherein the polycarbonate resin and the phosphorous compound are used as aromatic type.

The phosphorous compound disclosed herein may be an aromatic phosphate without being substituted by any halogen and selected from the group consisting of an alkyl group having a carbon atom number of 1 to 8, an aryl group having a carbon atom number of 6 to 20, and an aralkyl group having a carbon atom number of 7 to 12, which will be described below in the examples. The content of the phosphorous compound may be in the range of 5 to 20% by weight based on the total weight of the composition.

As an example of the aromatic phosphate may be aromatic monophosphate or aromatic diphosphate.

The said aromatic monophosphate may be at least one selected from the group consisting of trimethyl phosphate, triethyl phosphate, tributyl phosphate, trioctyl phosphate, triphenyl phosphate, tricresyl phosphate, trixylenyl phosphate, diphenylcresyl phosphate, diphenyloctyl phosphate, diphenyl-2-ethylcresyl phosphate and tri-(isopropylphenyl)-phosphate, but are not limited thereto.

Preferably, the aromatic monophosphate may be at least one selected from the group consisting of triphenyl phosphate, tricresyl phosphate and diphenylcresyl phosphate to improve physical properties.

Also, the aromatic diphosphate may be at least one of the compounds represented by below Formula 1 or 2, but are not limited thereto.

Formula 1

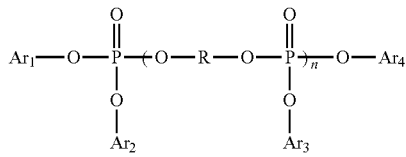

In the above Formula, $Ar_1$ to $Ar_4$ are each independently selected from the group consisting of a phenyl group, or an aryl group substituted with alkyl group having a carbon atom number of 1 to 4, wherein the alkyl group is presented one to three in the aryl group, R is phenyl or bisphenol A, and n is an integer of 1 to 5.

Formula 2

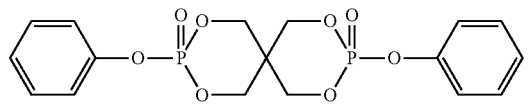

These aromatic monophosphates and aromatic diphosphates may be used alone or in combination thereof.

The phosphorous compound may be used in the range of 5 to 20% by weight based on the total weight of the resin composition. Flame retardancy may be deteriorated upon less than 5% by weight of the phosphorous compound, and flame retardancy may be improved, but processability may be degradation and other properties such as impact strength, may be deteriorated upon excess 20% by weight of the phosphorous compound. For example, the phosphorous compound may be in the range of 5 to 15% by weight.

Also, the ethylene-containing acrylic resin reinforces toughness of plastic materials and additionally improves fluidity, and may be in the range of 0.5 to 10% by weight based on the total weight of the composition.

When the content of ethylene in the ethylene-containing acrylic resin is too high, compatibility between the ethylene-containing acrylic resin and the polycarbonate resin decreases. When the content of ethylene is too low, impact resistance improvement is poor. The content of ethylene may be in the range of 20 to 60% by weight, or 15 to 50% by weight, based on the total weight of the resin.

The ethylene-containing acrylic resin may be an ethylene-methyl acrylate copolymer. The content of the ethylene-containing acrylic resin may be in the range of 0.5 to 10% by weight, or 0.5 to 5% by weight, based on the total weight of the composition. When the content of the ethylene-containing acrylic resin is less than 0.5% by weight based on the total weight of the composition, toughness reinforcing effect is negligible. When the content of the ethylene-containing acrylic resin is greater than 10% by weight, rigidity of the composition may be deteriorated.

Furthermore, the core-shell type resin selected at least one from the group consisting of the acrylic resin or the butadiene-based resin improves impact strength of a glass fiber-reinforced polycarbonate resin and improves dimensional stability by improving resistance of plastic materials against compression and flexure. For an example, the core-shell type resin may include at least one selected from the group consisting of a silicon-acrylic resin, a butadiene-based resin, and an acrylic rubber, each having a core-shell structure. The content of the core-shell type resin may be in the range of 1 to 10% by weight, or 1 to 5% by weight, based on the total weight of the composition. When the content of the compound is less than 1% by weight based on the total weight of the composition, impact resistance improvement is negligible. When the content of the compound is greater than 10% by weight, rigidity of the composition may be deteriorated.

The polycarbonate resin used herein may be, without being limited to, a non-halogen aromatic polymer of a bivalent phenol compound and phosgene or a carbonic acid diester, having a melt index of 3 to 30 g/10 min or less (300° C., 1.2 kg), or 10 to 22 g/10 min. In this regard, when the melt index is greater than 30 g/10 min, impact resistance, toughness, and chemical resistance may be deteriorated.

The content of the polycarbonate resin may be in the range of 30 to 80% by weight, or 39 to 69% by weight, based on the total weight of the composition. When the content of the polycarbonate resin is less than 30% by weight based on the total weight of the composition, binding strength of the resin may be deteriorated, so that desired impact resistance and esthetic surface may not be obtained. When the content of the polycarbonate resin is greater than 80% by weight, desired rigidity may not be obtained.

The glass fiber for reinforcement of the polycarbonate resin may be included a cocoon-type glass fiber or a flat-type glass fiber having a length of 2 to 5 mm and a cross-sectional aspect ratio of 2 to 10 and surface-treated with epoxy silane to obtain excellent flexibility and surface smoothness, but is not limited thereto. The cross-sectional aspect ratio is defined as the ratio of an average width of a cross-section of the glass fiber to a thickness of the cross-section of the glass fiber.

As described above, since the cocoon-type glass fiber or the flat-type glass fiber with improved binding strength with the polycarbonate resin is used, strong binding strength in polymers may be maintained to reinforce rigidity of the polycarbonate resin composition and improve flexibility and surface smoothness of the polycarbonate resin composition.

Here, the length of the glass fiber may be in the range of 2 to 5 mm. When the glass fiber is too short, surface quality may be improved and deformation may decrease, but rigidity and impact resistance may be considerably deteriorated. When the glass fiber is too long, rigidity and impact resistance may be improved, but the glass fiber protrudes from the surface and deformation increases. For example, the length of the glass fiber may be in the range of 2 to 4 mm.

In addition, the ratio of the average width to the thickness of the cross-section of the glass fiber corresponding to the cross-sectional aspect ratio thereof may be in the range of 2 to 10. Due to the high width/thickness ratio, flexibility and surface smoothness are improved, so that a strong frame may be manufactured upon a plastic process of a thin film product. For example, the cross-sectional aspect ratio may be in the range of 2 to 4.

In fact, the glass fiber may have higher binding strength with the polycarbonate resin due to wider surface area than conventional cylindrical glass fibers (Comparative Examples 1 and 2 and Additional Experimental Examples 1 and 2) and surface treatment with an epoxy silane-based material by a process such as an impregnation etc.

Furthermore, the specific gravity of the glass fiber may be in the range of 2 to 3.

In particular, the surface treatment of the glass fiber may be performed by use of epoxy silane. As shown in the following examples, it was confirmed that the glass fibers surface-treated with epoxy silane in Examples 1 to 6 exhibited improved impact strength and tensile strength in comparison with the glass fibers surface-treated with amino silane in Comparative Examples 1 to 2.

The glass fiber may be added to a side feeder of a twin screw extruder in an amount of 10 to 50% by weight, or 25 to 50% by weight, based on the total weight of all monomers in the composition. When the content of the glass fiber is less than 10% by weight based on the total weight of all monomers in the composition, desired rigidity may not be obtained. When the content of the glass fiber is greater than 50% by weight based on the total weight of all monomers in the composition, flowability and binding strength with the polycarbonate resin may be deteriorated, thereby increasing processing temperature. As a result, desired impact resistance and surface quality may not be obtained.

Furthermore, the polycarbonate resin composition may further include at least one elastomer resin selected from the group consisting of a polyester-based elastomer such as polyethylene terephthalate or polybutylene terephthalate, a polyolefin-based elastomer, and a polyurethane-based elastomer, in an amount of 1 to 10% by weight, or 1 to 5% by weight based on the total weight of all monomers in the composition in order to improve flowability of the resin composition and prevent reduction in impact strength. When the content of the elastomer resin is less than 1% by weight based on the total weight of all monomers in the composition, flowability is not improved. when the content of the elastomer resin is greater than 10% by weight based on the total weight of all monomers in the composition, heat resistance may be deteriorated and taking a product out of mold is not properly performed due to solidification time difference between polycarbonate and thermoplastic elastomer polymer, so that mechanical properties in weld line may be deteriorated.

For an example, the polycarbonate resin composition may comprise 30 to 80% by weight of a polycarbonate resin, 5 to 20% by weight of a phosphorous compound; 10 to 50% by weight of an epoxy silane-treated glass fiber; 0.5 to 10% by weight of an ethylene-containing acrylic resin; and 1 to 10% by weight of at least one core-shell type resin selected from the group consisting or the acrylic resin and the butadiene-based resin based on total 100% by weight of the composition.

For other example, the polycarbonate resin composition may comprise 30 to 80% by weight of a polycarbonate resin; 5 to 20% by weight of a phosphorous compound; 10 to 50% by weight of an epoxy silane-treated glass fiber; 0.5 to 10% by weight of an ethylene-containing acrylic resin; 1 to 10% by weight of at least one core-shell type resin selected from the group consisting of the acrylic resin and the butadiene-based resin; and 1 to 10% by weight of an elastomer resin based on the total 100% by weight of the composition.

The polycarbonate resin composition according to the present invention may further comprise at least one additive selected from the group consisting of an anti-dropping agent, a colorant, a lubricant, a UV stabilizer, an antioxidant, and a coupling enhancer in an amount of 0.01 to 10 parts by weight, or 0.05 to 5 parts by weight based on the overall weight of the resin composition, and they may be applied for a variety of purposes.

According to the present invention, the polycarbonate resin composition may have excellent fluidity, appearance surface quality and flexibility, together with high impact strength and toughness, and also flame retardancy. Thus, the polycarbonate resin composition may be applied to products required excellent flame retardancy and high rigidity such as housing parts of smart phones, tablet PCs, notebook computers, TVs, and the like.

The polycarbonate resin composition according to the present invention obtained as described above may be extruded at, but not limited to, a temperature of 230 to 300° C., or 250 to 290° C., to prepare pellets.

Hereinafter, the present invention will be described in more detailed with reference to the following examples. However, these examples are provided only for illustration and should not be construed as limiting the technical scope of the present invention.

EXAMPLES

Abbreviations of components used in the examples, comparative examples, Tables 1 and 2 will be described more fully hereinafter.

(A): Polycarbonate resin. (A)1 is bisphenol-A polycarbonate resin having a melt index of 10 g/10 min, (A)2 is bisphenol-A polycarbonate resin having a melt index of 22 g/10 min, and (A)3 is bisphenol-A polycarbonate resin having a melt index of 30 g/10 min.

(B): Phosphorous compound. Bisphenol-A diphosphate manufactured by ADEKA Corporation was used.

(C): Glass fiber. (C)1 is a flat-type glass fiber having a chop length of 3 mm and a cross-sectional aspect ratio (ratio of average width/thickness) of 4 and surface-treated with epoxy silane by impregnation, (C)2 is a cocoon-type glass fiber having a chop length of 3 mm and a cross-sectional aspect ratio of 2 and surface-treated with epoxy silane, and (C)3 is a general cylindrical glass fiber having a chop length of 3 mm and surface-treated with amino silane.

(D): Ethylene methyl acrylate copolymer. Elvaloy 1330AC manufactured by E.I. DuPont was used.

(E): Impact modifier having a core-shell structure. A silicon-acrylic impact modifier (product no.: SIM 100 manufactured by LG Chem. Ltd.) having a core-shell structure by a silicon-vinyl based compound.

(F) Thermoplastic elastomer polymer (Keyflex BT 1155D manufactured by LG Chem Ltd.) was used.

Examples 1 to 6 and Comparative Examples 1 to 2

The above components are added to a twin screw extruder according to an amount suggested in below Table 1, and component (C) was added to a side feeder. Then, the mixture was melted and kneaded at 270° C. to prepare pellets.

The pellets were injection molded using an injection molding machine to prepare test samples with a thickness of 1/8" as samples for evaluation of physical properties. The samples were tested in accordance with the below Test Items, and the results are shown in Table 1 below.

<Test Items>

Tensile Strength:

Tensile strength was measured in accordance with ASTM D638 using a universal testing machine (UTM) at 5 mm/sec at room temperature.

Flexural Strength and Flexural Modulus:

Flexural strength and flexural modulus were measured in accordance with ASTM D790.

Impact Strength:

Impact strength of samples having a thickness of 1/8" was measured in accordance with ASTM D256 at 23° C.

Fluidity (Melt Index & Spiral):

Fluidity was measured by use of two methods: melt index (MI) and spiral flow. The melt index (g/10 min) was measured by weight (gram unit) for 10 mins in accordance with ASTM D1238 under a load of 2.16 kg at 300° C. The spiral flow was measured by injection molding to a thickness of 2 mm at 280° C. and measuring the length of injection in molded products.

Flame Retardancy:

Flame retardancy was measured in accordance with the UL94 vertical test procedure at a thickness of 1.0 mm.

Surface Quality and Flexibility:

Appearance surface quality of a molded product was synthetically evaluated by use of a visual or tactile method and an electron microscope, results being graded from Grade 1 (Fair) to Grade 5 (Bad). The standard of a molded product as a reference (Grade 1) corresponds to appearance measured from products without any glass fiber.

As shown in the above Table 1, the thermoplastic resin according to the present invention prepared in Examples 1 to 6 exhibited excellent flowability, impact resistance, and toughness, together with appearance surface quality, and also flame retardancy.

In particular, since the cocoon-type glass fiber or the flat-type glass fiber used in Examples 1 to 6, better tensile strength and flexural modulus, good fluidity, surface smoothness, and flexibility were obtained in comparison with Comparative Examples 1 and 2 in which general glass fibers ((C)3) surface-treated with amino silane were used, when the same amounts of the glass fibers were used as shown in Table 1. This is because, the number of the flat-type glass fiber used in the present invention is less than that of the general cylindrical glass fiber at the same content and the contact area with a matrix resin is wider than that of the general cylindrical glass fiber.

Additional Experimental Examples 1 to 6

Additional abbreviations of components in the additional experimental examples and Table 2 will be described more fully hereinafter.

(G): Flame retardant agent except for phosphorous compound used herein, (G)1: Phosphazene flame retardant agent, (G)2: Potassium di-phenyl sulfone sulfonate as a metal salt-based flame retardant agent, and (G)3: Tribromophenyl-terminated tetrabromobisphenol-A carbonate oligomer, as a halogen flame retardant agent.

Test samples were prepared according to Additional Experimental Examples 1 to 6 by the components and amounts in Table 2 below and physical properties of the test samples were tested. The results are shown in Table 2 below.

TABLE 1

| Items | Example 1 | Example 2 | Example 3 | Example 4 | Example 5 | Example 6 | Comparative Example 1 | Comparative Example 2 |
|---|---|---|---|---|---|---|---|---|
| (A)1 | 69 | 54 | 39 | 54 | — | — | 69 | 61 |
| (A)2 | — | — | — | — | 54 | — | — | — |
| (A)3 | — | — | — | — | — | 54 | — | — |
| B | 15 | 15 | 5 | 15 | 15 | 15 | — | — |
| (C)1 | 10 | 25 | 50 | — | 25 | 25 | — | — |
| (C)2 | — | — | — | 25 | — | — | — | — |
| (C)3 | — | — | — | — | — | — | 25 | 30 |
| D | 3 | 3 | 3 | 3 | 3 | 3 | 3 | 3 |
| E | 3 | 3 | 3 | 3 | 3 | 3 | 3 | 3 |
| F | — | — | — | — | — | — | — | 3 |
| (G)1 | — | — | — | — | — | — | — | — |
| (G)2 | — | — | — | — | — | — | — | — |
| (G)3 | — | — | — | — | — | — | — | — |
| Tensile strength | 850 | 1,150 | 1,400 | 1,100 | 1,200 | 1,250 | 950 | 1,100 |
| Flexural strength | 1,200 | 1,600 | 2,100 | 1,500 | 1,700 | 1,730 | 1,150 | 1,800 |
| Flexural modulus | 45,000 | 78,000 | 145,000 | 75,000 | 80,000 | 81,000 | 70,000 | 81,000 |
| Impact strength | 9 | 11 | 11 | 10 | 11 | 11 | 8 | 18 |
| Melt index | 15 | 17 | 12 | 16 | 20 | 24 | 6 | 9 |
| Spiral flow | 22 | 18 | 16 | 18 | 21 | 27 | 7 | 8 |
| Appearance/smoothness | 2 | 2 | 3 | 3 | 2 | 2 | 5 | 5 |
| Flame retardancy | V0 | V0 | V0 | V0 | V0 | V0 | Burn-out | V2 |

TABLE 2

| Items | Additional Experimental Example | | | | | |
|---|---|---|---|---|---|---|
| | 1 | 2 | 3 | 4 | 5 | 6 |
| (A)1 | 49 | 54 | 39 | 54 | 54 | 54 |
| (A)2 | — | — | — | — | — | — |
| (A)3 | — | — | — | — | — | — |
| B | 15 | 15 | 15 | — | — | — |
| (C)1 | 25 | — | — | 25 | 25 | 25 |
| (C)2 | — | — | — | — | — | — |
| (C)3 | — | 25 | 40 | — | — | — |
| D | 3 | 3 | 3 | 3 | 3 | 3 |
| E | 3 | 3 | 3 | 3 | 3 | 3 |
| F | 5 | — | — | — | — | — |
| (G)1 | — | — | — | 15 | — | — |
| (G)2 | — | — | — | — | 0.5 | — |
| (G)3 | — | — | — | — | — | 15 |
| Tensile strength | 1,170 | 1,000 | 1,300 | 1,100 | 1,070 | 1,050 |
| Flexural strength | 1,620 | 1,180 | 1,700 | 1,500 | 1,470 | 1,450 |
| Flexural modulus | 78,300 | 72,000 | 105,000 | 76,000 | 75,500 | 75,000 |
| Impact strength | 11 | 5 | 5 | 9 | 9 | 8 |
| Melt index | 22 | 13 | 8 | 10 | 8 | 7 |
| Spiral | 24 | 15 | 12 | 12 | 10 | 9 |
| Appearance/smoothness | 2 | 4 | 4 | 5 | 5 | 5 |
| Flame retardancy | V0 | V1 | V2 | V0 | V0 | V0 |

Reinforcement effect of the elastomer resin was not proved from the results of Comparative Example 2 shown in Table 1. In case of the elastomer resin used with a suitable glass fiber as in Additional Experimental Example as shown in above Table 2, reinforcement effect was considerably improved.

In addition, referring to Table 2, when general cylindrical glass fibers are applied as in Additional Experimental Examples 2 and 3, tensile strength, flexural modulus, fluidity, surface smoothness, and flexibility were reduced compared to Examples 2 to 6 under the same content. This is because the number of the flat-type glass fibers used in the present invention is less than that of the general cylindrical glass fibers at the same content and the contact area with the matrix resin is wider than that of the general cylindrical glass fiber.

Furthermore, when the phosphazene flame retardant agent, the metal salt-based flame retardant agent, and the halogen flame retardant agent were used instead of bisphenol-A diphosphate used in Example 2 as the phosphorous compound according to Additional Experimental Examples 4, 5, and 6, flame retardancy was improved, but flowability and fluidity of the resin were reduced, tensile/flexural strength, flexural modulus, impact strength, surface quality, and surface smoothness were also reduced.

As is apparent from the above description, the present invention provides a polycarbonate resin composition having excellent fluidity, appearance surface quality and flexibility, together with high impact resistance and toughness, and also flame retardancy.

What is claimed is:

1. A non-halogen flame retardant and high rigidity polycarbonate resin composition comprising a polycarbonate resin; a phosphorous compound; a glass fiber; an ethylene-containing acrylic resin; and at least one core-shell type resin selected from the group consisting of an acrylic resin and a butadiene based resin;
    wherein the polycarbonate resin is an aromatic resin and the phosphorous compound is an aromatic compound, and
    wherein the ethylene-containing acrylic resin is an acrylic resin including 20 to 60% by weight of ethylene.

2. The non-halogen flame retardant and high rigidity polycarbonate resin composition according to claim 1, wherein the phosphorous compound is an aromatic phosphate without being substituted by any halogen, and selected from the group consisting of an alkyl group having a carbon atom number of 1 to 8, an aryl group having a carbon atom number of 6 to 20, and an aralkyl group having a carbon atom number of 7 to 12.

3. The non-halogen flame retardant and high rigidity polycarbonate resin composition according to claim 1, wherein the phosphorous compound is aromatic monophosphate or aromatic diphosphate.

4. The non-halogen flame retardant and high rigidity polycarbonate resin composition according to claim 3, wherein the aromatic monophosphate is selected one or more from the group consisting of trimethyl phosphate, triethyl phosphate, tributyl phosphate, trioctyl phosphate, triphenyl phosphate, tricresyl phosphate, trixylenyl phosphate, diphenylcresyl phosphate, diphenyloctyl phosphate, diphenyl-2-ethylcresyl phosphate, and tri-(isopropylphenyl)-phosphate.

5. The non-halogen flame retardant and high rigidity polycarbonate resin composition according to claim 1, wherein the phosphorous compound is one or more selected from the group consisting of triphenyl phosphate, tricresyl phosphate, and diphenylcresyl phosphate.

6. The non-halogen flame retardant and high rigidity polycarbonate resin composition according to claim 3, wherein the aromatic diphosphate is one or more compound selected from Formula 1 and Formula 2:

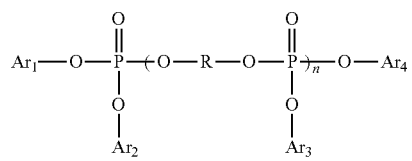

Formula 1 in the above Formula, $Ar_1$ to $Ar_4$ are each independently selected from the group consisting of a phenyl group, or an aryl group substituted with alkyl group having a carbon atom number of 1 to 4, wherein the alkyl group is presented one to three in the aryl group, R is phenyl or bisphenol A, and n is an integer of 1 to 5; and

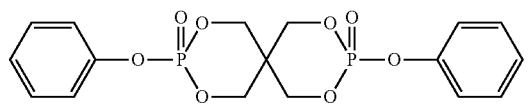

Formula 2

7. The non-halogen flame retardant and high rigidity polycarbonate resin composition according to claim 1, wherein a content of the phosphorous compound is 5 to 20% by weight based on the total weight of the composition.

8. The non-halogen flame retardant and high rigidity polycarbonate resin composition according to claim 1, wherein a content of the ethylene-containing acrylic resin is in the range of 0.5 to 10% by weight based on the total weight of the composition.

9. The non-halogen flame retardant and high rigidity polycarbonate resin composition according to claim 1, wherein the core-shell type resin is at least one selected from the group consisting of a silicon-acrylic resin, a butadiene-based resin, and an acrylic rubber, each having a core-shell structure.

10. The non-halogen flame retardant and high rigidity polycarbonate resin composition according to claim 1, wherein the core-shell type resin is 1 to 10% by weight based on the total weight of the composition.

11. The non-halogen flame retardant and high rigidity polycarbonate resin composition according to claim 1, wherein the polycarbonate resin is a non-halogen aromatic polymer of a bivalent phenol compound and phosgene or a carbonic acid diester.

12. The non-halogen flame retardant and high rigidity polycarbonate resin composition according to claim 1, wherein the polycarbonate resin has a melt index of 3 to 30 g/10 min under 300° C. and a load of 1.2 kg.

13. The non-halogen flame retardant and high rigidity polycarbonate resin composition according to claim 1, wherein the polycarbonate resin is 30 to 80% by weight based on the total weight of the composition.

14. The non-halogen flame retardant and high rigidity polycarbonate resin composition according to claim 1, wherein the glass fiber has a length of 2 to 5 mm and a cross-sectional aspect ratio of 2 to 10.

15. The non-halogen flame retardant and high rigidity polycarbonate resin composition according to claim 1, wherein the glass fiber is a cocoon-type glass fiber or a flat-type glass fiber.

16. The non-halogen flame retardant and high rigidity polycarbonate resin composition according to claim 1, wherein the glass fiber is added to a side feeder of a twin screw extruder in an amount of 10 to 50% by weight based on the total weight of the composition.

17. The non-halogen flame retardant and high rigidity polycarbonate resin composition according to claim 1, further comprising an elastomer resin.

18. The non-halogen flame retardant and high rigidity polycarbonate resin composition according to claim 1, further comprising at least one selected from the group consisting of an anti-dropping agent, a colorant, a lubricant, a UV stabilizer, an antioxidant, and a coupling enhancer in an amount of 0.01 to 10 parts by weight based on 100 parts by weight of the composition.

19. A molded product prepared by the non-halogen flame retardant and high rigidity polycarbonate resin composition according to claim 1.

* * * * *